Patented Jan. 8, 1935

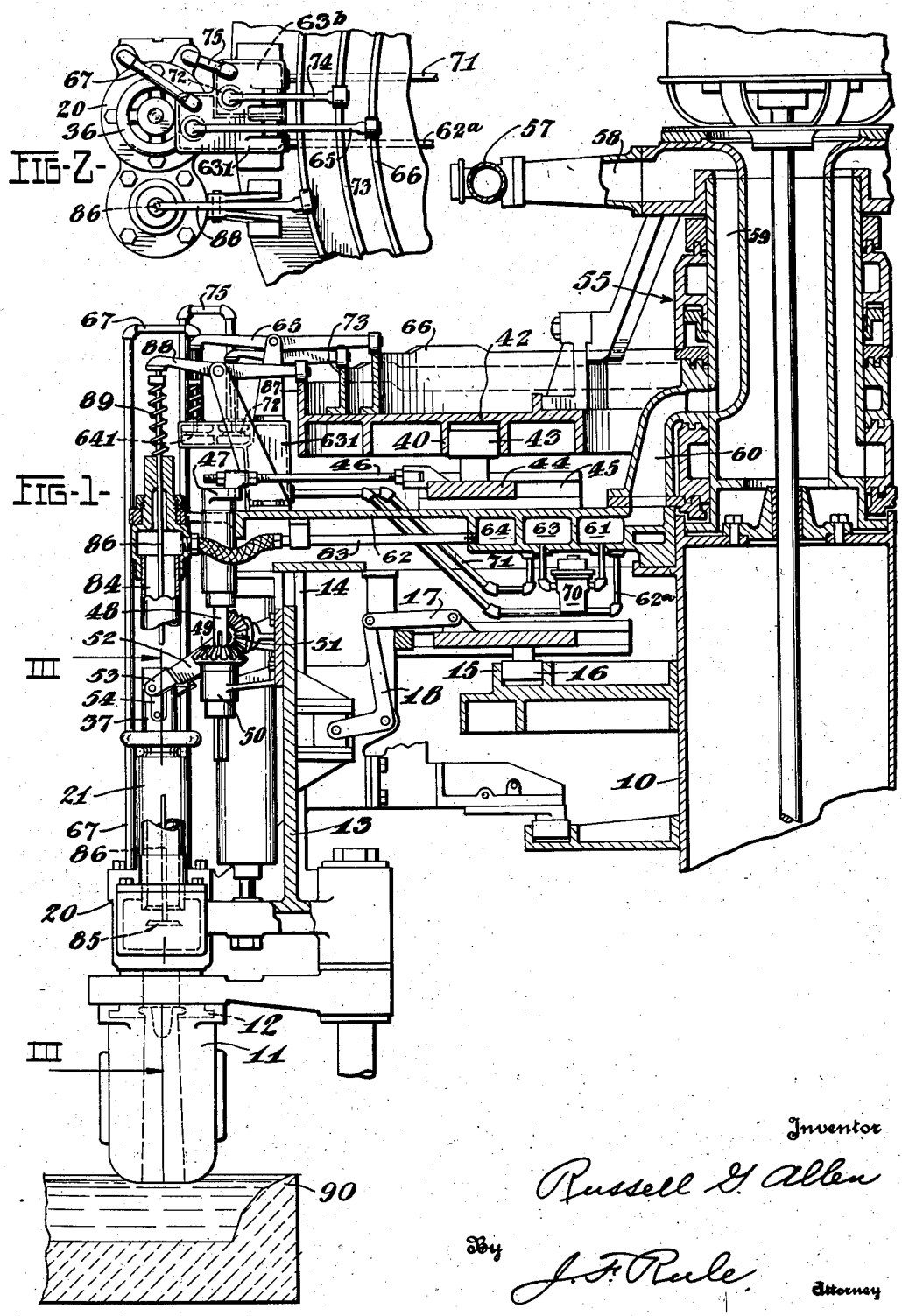

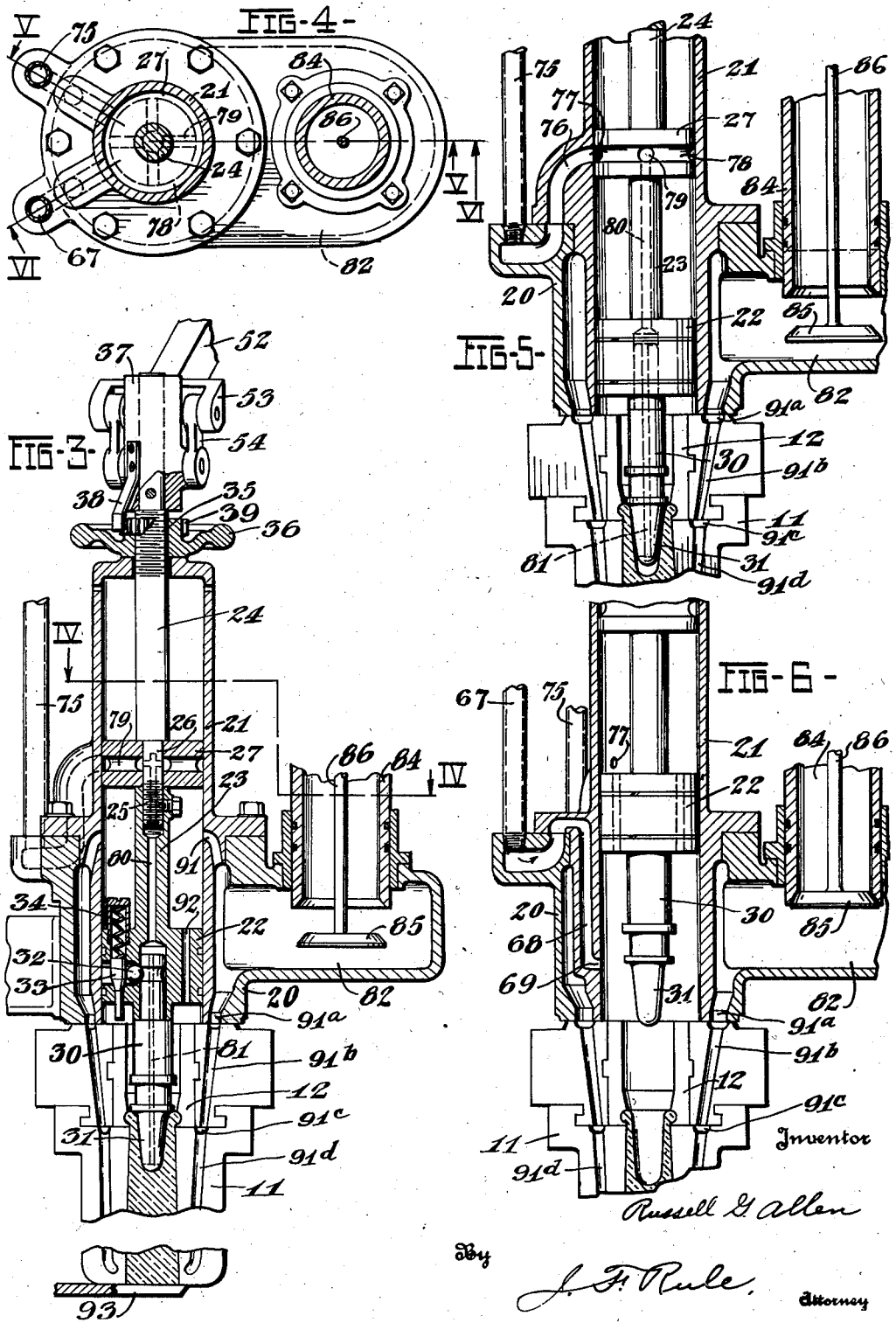

1,986,912

UNITED STATES PATENT OFFICE 1,986,912

MACHINE FOR MOLDING GLASS ARTICLES

Russell G. Allen, Alton, Ill., assignor to Owens-Illinois Glass Company, a corporation of Ohio Application March 10, 1933, Serial No. 660,276

3 Claims. (Cl. 49—5)

My invention relates to improvements in machines for blowing hollow glass articles such as bottles and jars, and more particularly to machines of the suction gathering type in which the charges of molten glass are drawn by suction into the molds.

In machines of this type, the charge of glass is ordinarily introduced into a parison mold comprising a body blank mold open at its lower end to receive the charge and a neck mold above and in register with the blank mold. A plunger which projects downward into or through the neck mold while a charge of glass is entering the mold, serves to shape a portion of the top or lip of the article being formed and usually the inner neck surface of the article. The plunger is later withdrawn, leaving an initial blow opening in the parison.

In order to provide a smooth surface on the top or lip of the blown article, it is necessary to maintain the surface forming portion of the plunger in accurate register with the adjoining surface of the surrounding neck ring or mold. This requires that the height of the plunger while in its lowered or glass forming position must be accurately adjusted. The plunger is ordinarily moved up and down under the control of a stationary cam, the operating connections between the cam and plunger including several moving parts, which renders it difficult or impractical to maintain the required accuracy of adjustment of the plunger without some means for readily adjusting it up and down.

An object of my invention is to provide a simple and practical construction to meet this requirement and to this end I have provided means by which a fine and accurate vertical adjustment of the plunger can be easily effected. The invention further provides for making such adjustment while the machine is in operation.

A further feature of the invention relates to the means for blowing the parison in the mold in combination with the means for drawing the glass by suction into the mold and maintaining the suction during the application of air pressure internally of the parison. It is common practice to form the parison by drawing the glass by suction into the parison mold while the plunger is in its lowered position, then withdrawing the plunger and applying air pressure to the initial blow opening which has been formed by the plunger tip, thereby completing the parison in the mold. Air pressure applied in this manner has a tendency to force the glass downward out of the neck mold to a certain extent, resulting in an imperfect parison, unless the glass is permitted to cool and set sufficiently to hold its shape when the plunger is withdrawn and air pressure applied.

An object of the present invention is to provide novel means whereby the blowing of the parison may be effected while the plunger is in its lowered or operative position within the mold and while the vacuum is still maintained. In accordance with my invention, the plunger is provided with a central air passage therethrough by which air pressure is admitted to the parison while the plunger is still in its lowered position. In this manner, the combined action of the vacuum and of the air pressure holds the glass in intimate contact with the mold walls, giving perfect formation to the parison and also materially reducing the length of time required to set the glass.

A further feature of the invention relates to the provision of means by which the degree of air pressure applied to the parison after the plunger is withdrawn may be different from that applied through the plunger while in its lowered position. A higher pressure is sometimes desirable for blowing the parison after the plunger is lifted, than that required while the plunger is in its lowered position while the glass is comparatively soft and plastic.

Other objects of the invention will appear hereinafter.

In the accompanying drawings:

Figure 1 is a sectional elevation with parts broken away, showing a machine constructed in accordance with the principles of my invention.

Fig. 2 is a fragmentary top plan view of mechanism shown in Figure 1.

Fig. 3 is a sectional elevation at the line III—III on Figure 1.

Fig. 4 is a sectional plan at the line IV—IV on Fig. 3.

Fig. 5 is a sectional elevation at the line V—V on Fig. 4, showing the plunger in its lowered position.

Fig. 6 is a section at the line VI—VI on Fig. 4, the plunger being shown in its lifted position.

The machine herein shown embodies certain improvements over the machine disclosed in the patent to Kadow et al., Number 1,879,689, September 27, 1932, to which patent reference may be had for a full disclosure of various features of construction and operation of the machine herein shown.

Referring particularly to Figure 1, the machine comprises a mold carriage which is rotated continuously about a vertical center column 10. Carried on the mold carriage are a series of units each comprising a mold group including a partible blank mold 11 and a neck mold 12 which together form the parison mold. The mold group is supported on a dip head including a frame 13 which is mounted for vertical reciprocation in guides 14 on the mold carriage. The up and down movements of the dip frame are controlled by a stationary cam 15 on which runs a cam roll 16 having the usual connections with the dip frame, including link 17 and bell crank 18.

A combined suction and blowing head 20 is mounted on or forms part of the dip head, said head 20 being directly over and in register with the neck mold 12. Mounted on the head 20 is an air cylinder 21. Within said cylinder is a piston 22 and piston rod including lower and upper sections 23 and 24 having a screw threaded connection 25. The section 24 comprises a stem 26 of reduced diameter, on which is mounted a valve 27. The piston rod 23, 24 is made in sections, as above described, to facilitate assembling of the parts.

Removably attached to the piston 22 and depending therefrom is a plunger 30 which projects downward through the neck mold and is formed at its lower end with a tip 31 which may be shaped, as usual, to mold the inner surface of the parison neck. The upper portion of the plunger tip is designed to register with the surrounding neck ring or mold 12 and together therewith provides a mold cavity for shaping the lip of the parison. The plunger is removably attached to the piston head 22 by means of a ball 32 which engages an annular groove in the plunger. A plug 33 holds the ball in plunger locking position. The plunger can be quickly removed by pushing the plug 33 upward, thereby permitting the ball 32 to drop away from the plunger. A coil spring 34 normally holds the plug down in its locking position.

The rod 24 comprises a screw threaded portion 35 on which is mounted a correspondingly threaded hand wheel 36 directly above and supported by the cylinder 21. The rod 24 extends freely through an opening in the top of said cylinder. A head 37 keyed to the upper end of the rod 24, carries a spring detent 38 which bears against rack teeth 39 on the wheel 36 for holding the latter against accidental rotation. By rotating the hand wheel 36, the rod 24 and parts carried thereby, including the plunger, may be adjusted up and down. In this manner, the plunger may be readily adjusted to accurately align with the neck mold and such adjustment can be easily effected, if desired, while the machine is in operation.

The mechanism for lifting and lowering the plunger and associated mechanism includes a cam 40 (Fig. 1) formed on a stationary cam plate 42. A roll 43 running on said cam is carried by a slide block 44 mounted to reciprocate radially of the mold carriage in guides 45 on the carriage. The block 44 is connected through a rod 46 to a crank arm 47 on a vertical rock shaft 48 on which is splined a pinion 49 supported on a bearing 50 on the dip frame. A gear segment 51 in mesh with the pinion 49 is carried on a shaft to which is attached a rock arm 52. The arm 52 (see Fig. 3) is formed with a yoke 53 connected through links 54 to the head 37.

The air pressure and vacuum lines leading to the head 20 extend through a distributing head 55 at the upper end of the central column 10. This distributing head may be of the same construction as, or similar to, that fully disclosed in United States Patent Number 1,806,731, granted in my name, May 26, 1931.

Air under high pressure is supplied to the machine through a stationary pressure pipe 57 (Fig. 1). The pressure line extends through passageways 58 and 59 in the stationary part of the machine and through a passageway 60 in the rotating mold carriage, the passageway 60 opening into a high pressure chamber 61. The chamber 61 is formed in a plate 62 which is a part of the mold carriage, said plate also being formed with a low pressure air chamber 63 and a vacuum chamber 64.

The high pressure air line continues from the chamber 61 through a pipe $62^a$ which leads to a valve box 631 (Figs. 1 and 2). Said valve box includes a high pressure chamber in which is mounted a valve 641. The valve is actuated by a lever 65 under the control of a stationary cam 66 mounted on the plate 42. When the valve 641 is opened by its cam the air under pressure is admitted to a pipe 67 which extends downward to the head 20 (see Fig. 6), the pressure line continuing through a channel 68 in said head and opening through a port 69 into the cylinder 21 near the lower end thereof.

Air under comparatively low pressure is supplied from the low pressure chamber 63 (Fig. 1), the low pressure air being supplied to the chamber 63 through a pressure reduction valve 70 connected between the chambers 61 and 63. From the chamber 63 a pipe 71 extends to the low pressure chamber $63^b$ (Fig. 2) in the valve box 631. A valve 72 in the chamber $63^b$ is controlled by a cam 73 operating through a lever 74. When the valve 72 is opened by its cam, low pressure air is admitted to a pipe 75 which extends downward to the head 20 (see Fig. 5). The air line extends from the pipe 75 through a passageway 76 to a port 77 opening into the cylinder 21.

When the plunger 30 is in its lowered position, the valve 27 is opposite the low pressure port 77 so that an annular passageway 78 therein registers with said port. Radial openings 79 in the valve 27 provide communication between the annular passageway 78 and a channel 80 extending from the valve 27 downward to the plunger 30. The plunger is formed with a longitudinal bore 81 forming a continuation of the low pressure line, said bore 81 extending downward to the tip of the plunger and opening therethrough. It will be seen that when the plunger is in its lowered position (Fig. 3), low pressure air may be supplied from the chamber 63 through the plunger and applied to the parison, as set forth hereinafter, the application of the low pressure air being under the control of the valve 72 (Fig. 1).

A vacuum line extends from the vacuum chamber 64 to a vacuum chamber 82 in the head 20. This line includes a pipe 83 leading to the chamber 64 to a vertical pipe 84, the lower end of which opens into the chamber 82. A valve 85 is provided at the lower end of the pipe 84, said valve being connected to a stem 86 which extends upward through the pipe. A stationary cam 87 operates through a lever 88 to periodically move the valve stem 86 downward for opening the valve 85. The valve is returned to its closed position by a spring 89.

The operation is as follows: When a mold 11 is brought over the gathering tank 90 by the rotation of the mold carriage, the cam 15 operates to lower the mold carrying frame 13 and thereby bring the mold into gathering contact with the glass in the tank. The plunger 30 is at this time in its lowered position in which the plunger tip projects into the mold as shown in Figs. 3 and 5. When the mold has been brought to its gathering position the cam 87 (Fig. 1) operates to lower the valve 85 so that the air is exhausted from the vacuum chamber 82. Said chamber opens through a port 91 (Fig. 3) into the cylinder 21 at a point beneath the valve 27. A passageway 92 extends through the piston head 22 so that air is exhausted from the neck mold and blank mold through said passageway. Air is also exhausted through ports 91ᵃ in the bottom of the head 20 and grooves 91ᵇ extending downward through the neck mold to an annular groove 91ᶜ in the top face of the blank mold. The groove 91ᶜ registers with the usual grooves 91ᵈ extending lengthwise of the blank mold in the meeting faces thereof, which faces are slightly undercut as usual to provide an air passage between the grooves 91ᵈ and the blank mold cavity. The exhaustion of the air through these passageways causes the blank mold and neck mold to be filled with a charge of glass.

The mold frame 13 is then lifted and a knife 93 shears across the bottom of the blank mold to sever the glass and form a temporary closure for the lower end of the mold cavity. While the knife is retained in its mold closing position (Fig. 3) and preferably while the vacuum valve 85 remains open, low pressure air is supplied through the plunger 30 for expanding the parison in the blank mold and compacting the glass. This low pressure air is supplied under the control of the valve 72 (Fig. 1) actuated by the cam 73. By supplying the air pressure while the vacuum is still retained, the parison will be expanded in the blank mold a comparatively short time after the glass is introduced into the mold and without danger of the air pressure blowing the glass away from the mold walls and deforming the parison.

When the parison has cooled and set sufficiently to retain its shape, the plunger is withdrawn by the cam 40 operating in the manner heretofore described. The application of low pressure air may be continued, if desired, after the plunger has been lifted, said pressure being then supplied through the passageway 92 in the piston 22, to the neck mold. If desired, high pressure from the high pressure chamber 61 may be transmitted to the parison after the plunger has been withdrawn, said high pressure being under the control of the stationary cam 66 operating through the lever 65 to open the high pressure valve 64¹, so that the pressure is transmitted through the pipe 67 and passageway 68 to the port 69. This high pressure is only applied momentarily to the blank or parison for compacting the glass in the mold and is then cut off by closing the valve 64¹. After the blank mold passes beyond the gathering tank it is opened and the finishing mold then closed around the parison which is suspended from the neck mold. The valve 64¹ is then opened, again admitting high pressure air to and through the neck mold for expanding the parison to its final form in the finishing mold.

Modifications may be resorted to within the spirit and scope of my invention.

What I claim is:

1. The combination of a parison mold, a plunger having a passageway extending therethrough, means for moving the plunger to an operative position in which it projects into the mold, means for applying suction to the mold and thereby drawing a charge of glass by suction into the mold, means for supplying air under pressure through said passageway in the plunger while the latter is in its said operative position and while said suction is maintained, and means for applying air under a higher pressure to the blow opening formed by the plunger, after the plunger has been withdrawn.

2. In a machine for forming glass articles, the combination of a parison mold, a cylinder, a piston, means for reciprocating the piston in said cylinder, a plunger carried by the piston and movable thereby to an operative position in which it projects into the mold, said plunger having an air passageway extending therethrough, means for supplying air under pressure to said passageway, and a valve within said cylinder connected to the piston, said valve operable to control the supply of air under pressure to said air passageway in the plunger.

3. In a machine for forming glass articles, the combination of a parison mold, a cylinder, a piston, means for reciprocating the piston in said cylinder, a plunger carried by the piston and movable thereby to an operative position in which it projects into the mold, said plunger having an air passageway extending therethrough, means for supplying air under pressure to said passageway, and a valve within said cylinder connected to the piston, said valve constructed and arranged to establish communication between the air pressure supply and the passageway through the plunger while the latter is in its said operative position and to cut off said passageway from the air supply when the plunger is retracted.

RUSSELL G. ALLEN.